UNITED STATES PATENT OFFICE 2,526,443

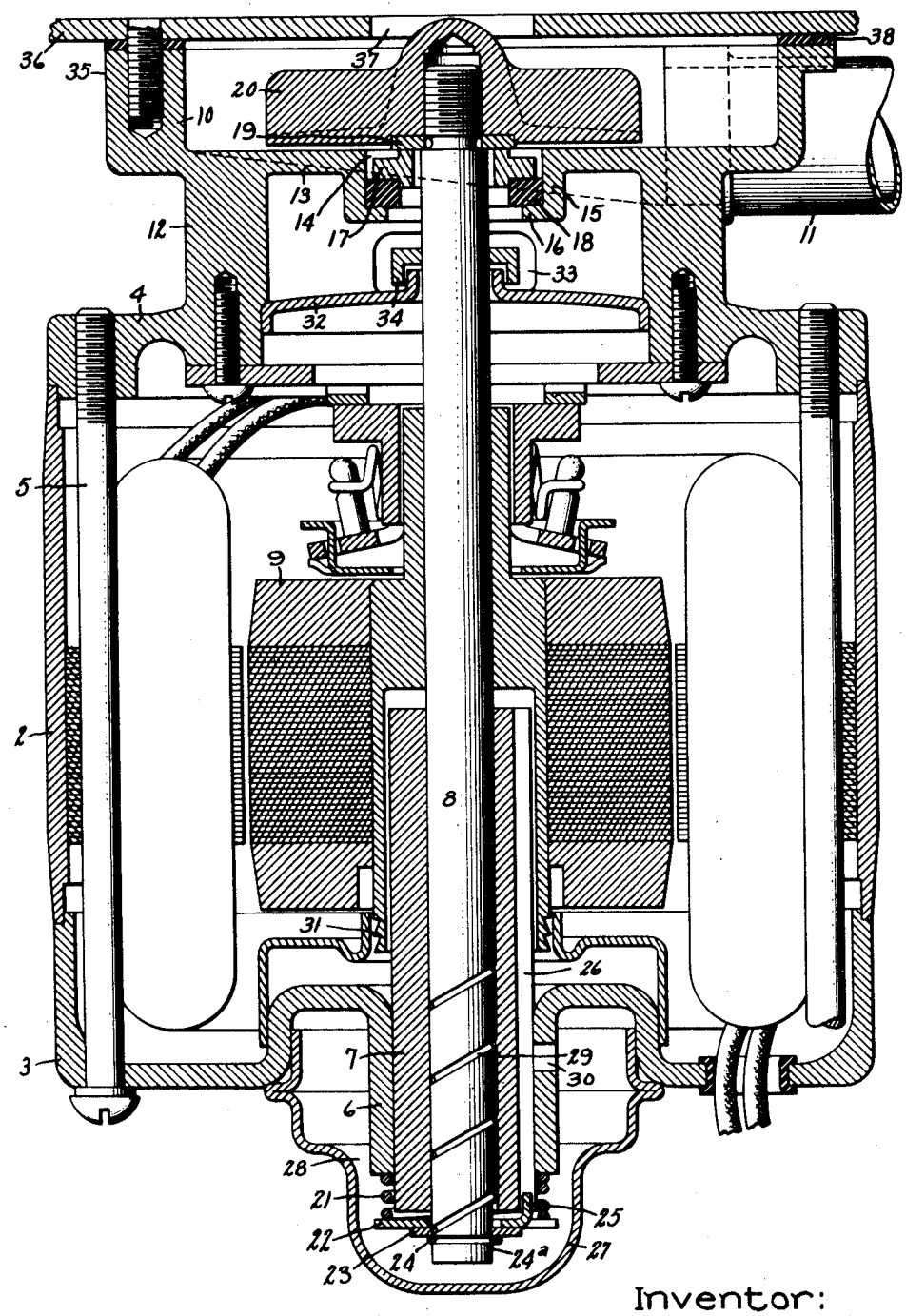

ELECTRIC MOTOR-DRIVEN PUMP

Thomas T. Woodson, Fairfield, Conn., assignor to General Electric Company, a corporation of New York Application November 23, 1945, Serial No. 630,438

2 Claims. (Cl. 103—87)

The present invention relates to electric motor driven pumps and particularly small electric motor driven centrifugal pumps such as are used in connection with clothes washing machines for circulating water during washing or rinsing or for emptying the machine.

The object of the invention is to provide an improved pump which is simple and compact in structure, reliable in operation, and capable of being manufactured, assembled and attached to a support, such as the bottom wall of a washing machine tub, at low cost and with a minimum amount of labor.

For a consideration of what I consider to be novel and my invention, attention is directed to the following specification and to the claims appended thereto.

In the drawing, the figure is a sectional view of a pump embodying my invention.

Referring to the drawing, 1 indicates the field winding of an electric motor supported in a surrounding motor housing side wall 2 the ends of which are closed by a lower head or end cap 3 and an upper head or end cap 4. The side wall and end caps are held together by bolts 5.

Lower end cap 3 is provided with a centrally located opening surrounded by a flange 6 in which is pressed a bearing sleeve 7. Bearing sleeve 7 projects from a point slightly below the lower end of flange 6 to a point well within the motor casing. Mounted in bearing sleeve 7 is a shaft 8 on which is mounted the motor armature 9. Bearing sleeve 7 is of substantial length and forms the sole bearing for the motor shaft. It telescopes well within the motor armature, as shown clearly in the drawing. By this arrangement whereby only a single long bearing sleeve is utilized for the shaft which sleeve is pressed into and forms a part of the motor shell, I provide a construction having low cost with respect both to cost of manufacture and cost of materials. As to the latter, the end cup 3 may be a drawn steel shell which can be provided at low cost; only the sleeve need be formed of higher cost material, such as sintered iron, or a suitable cast metal such as cast iron. At the same time the overall length of the pump is not increased.

Formed integral with upper end cap 4 are walls which define a pump housing 10 having a tangential discharge conduit 11, the housing being formed integral with and being supported by a vertically extending tubular neck 12 which forms a part of the end cap. The bottom wall 13 of the pump housing is provided with a central opening 14 surrounded by a wall 15 provided with an inturned flange 16. Positioned within wall 15 is a thrust collar 17 supported on flange 16. A sealing ring 18 of rubber or other suitable material is positioned between the thrust collar and the flange to form a tight joint. The upper end of shaft 8 extends freely through thrust collar 17 and has fixed thereon a thrust washer 19 which rides on the upper surface of thrust collar 17. Thrust collar 17 and thrust washer 19 are made from suitable bearing materials. On the upper end of shaft 8 in the pump housing is a centrifugal pump impeller 20 of known type adapted to receive water at its central portion or eye and discharge it at its periphery. The entire rotor comprising shaft 8, impeller 20, and armature 9 is supported by thrust collar 17 through the intermediary of thrust washer 19. To hold the thrust washer down in yielding engagement with the thrust collar, a coiled spring 21 is provided at the lower end of the shaft. Coiled spring 21 is positioned between the lower end of flange 6 and a thrust ring 22. Thrust ring 22 rides on a thrust collar 23 fixed on the end of shaft 8 to turn with the shaft and held by a snap ring 24. In the present instance the end of the shaft has a flat surface 24a against which fits a straight side of the opening through collar 23. Thrust ring 22 is held from turning by an integral struck-up ear 25 positioned in the lower end of a vertical groove 26 which extends throughout the length of bearing sleeve 7.

Suitably fastened to the lower side of the end cap 3 is an oil cup 27 which defines, together with the adjacent wall of cap 3, an oil reservoir or chamber 28. In reservoir 28 is placed a supply of oil for the pump bearing. In the lower end of shaft 8 is a spiral oil groove 29 which serves to pump oil from chamber 28 up along the shaft. The oil is discharged from the upper end of the bearing sleeve and flows back to the oil chamber through groove 26. In flange 6 is a breather opening 30 which serves to prevent the expulsion of oil up slot 26 as air in reservoir 28 expands by heat during the operation of the pump. At 31 is a labyrinth packing to prevent the escape of oil into the motor housing.

To prevent any water which might leak past sealing ring 18 from falling into the motor casing, there is provided a water shield 32 fixed in tubular neck 12 which directs any leakage out through an opening or openings 33 in the wall of neck 12. At 34 is a water slinger which is fixed on and rotates with shaft 8 and which functions to sling outward by centrifugal force any water which may leak down onto it.

The pump housing does not have a top wall. It is provided with a side wall flange 35 by means of which it may be screwed or bolted to a supporting wall 36 which may be, for example, the bottom wall of a washing machine tub. The wall 36 is provided with an opening 37 through which water may flow to the impeller. At 38 is a suitable pump gasket. With this arrangement, the pump structure may be bolted or screwed to or removed from a wall such as the bottom wall of a washing machine tub or the like with a minimum of time and effort.

What I claim as new and desire to secure by Letters Patent of the United States is:

1. A single bearing electric motor driven pump for operation on a vertical axis comprising a motor casing having upper and lower end caps, a pump housing forming a part of the upper end cap, a vertical tube forming a shaft bearing supported in the lower end cap, a shaft in said bearing, an impeller in the pump housing on the end of said shaft, a thrust collar supported on the upper end cap, a thrust washer fixed on the shaft and resting on the upper surface of said thrust collar to form the sole support for the shaft, and a spring positioned between the lower end cap and the lower end of said shaft for biasing the shaft downward to hold the thrust washer yieldingly in engagement with said thrust collar, whereby the shaft is hung on the upper end cap and is journaled in the lower end cap.

2. A single bearing electric motor driven pump for operation on the vertical axis comprising a motor casing having upper and lower end caps, a pump housing forming a part of the upper end cap, a vertical tube forming a shaft bearing supported in the lower end cap, a shaft in said bearing, an impeller in the pump housing on the end of said shaft, a thrust collar supported on the upper end cap, a thrust washer fixed on the shaft and resting on the upper surface of said thrust collar to form the sole support for the shaft, a thrust washer on the lower end of said shaft, and means acting on said last-named thrust washer to bias the first-named thrust washer against said thrust collar, whereby the shaft is hung on the upper end cap and is journaled in the lower end cap.

THOMAS T. WOODSON.

REFERENCES CITED

The following references are of record in the file of this patent:

UNITED STATES PATENTS

| Number | Name | Date |
| --- | --- | --- |
| 1,554,264 | Eichhoff | Sept. 22, 1925 |
| 1,631,619 | Buvinger et al. | June 7, 1927 |
| 1,644,130 | Hollander | Oct. 4, 1927 |
| 1,967,316 | Meeker | July 24, 1934 |
| 2,239,723 | Limpert et al. | Apr. 29, 1941 |
| 2,316,007 | Lockett | Apr. 6, 1943 |
| 2,319,934 | Korte et al. | May 25, 1943 |
| 2,320,708 | Yost | June 1, 1943 |

FOREIGN PATENTS

| Number | Country | Date |
| --- | --- | --- |
| 141,014 | Austria | Jan. 15, 1934 |
| 218,460 | Germany | Aug. 13, 1909 |